US009025215B2

(12) United States Patent
Kozaki et al.

(10) Patent No.: US 9,025,215 B2
(45) Date of Patent: May 5, 2015

(54) CABLE WIRING STRUCTURE AND IMAGE READING DEVICE

(71) Applicants: Daisuke Kozaki, Nagoya (JP); Yasuhiro Hosokawa, Fuso-cho (JP)

(72) Inventors: Daisuke Kozaki, Nagoya (JP); Yasuhiro Hosokawa, Fuso-cho (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/036,211

(22) Filed: Sep. 25, 2013

(65) Prior Publication Data

US 2014/0085688 A1 Mar. 27, 2014

(30) Foreign Application Priority Data

Sep. 25, 2012 (JP) ................. 2012-211166

(51) Int. Cl.
H04N 1/19 (2006.01)
H04N 1/10 (2006.01)
B41J 2/17 (2006.01)
H04N 1/028 (2006.01)
H04N 1/00 (2006.01)

(52) U.S. Cl.
CPC ........... *H04N 1/028* (2013.01); *H04N 1/00907* (2013.01)

(58) Field of Classification Search
USPC .................... 358/482, 474, 296, 497; 347/85; 271/10.03
See application file for complete search history.

(56) References Cited

U.S. PATENT DOCUMENTS

| 5,880,852 | A   | * | 3/1999  | Asano et al. ........... 358/296 |
| 6,135,439 | A   | * | 10/2000 | Ikeda ................. 271/10.03 |
| 7,969,621 | B2  |   | 6/2011  | Shunji |
| 8,547,604 | B2  | * | 10/2013 | Kozaki et al. ......... 358/474 |
| 2007/0252875 | A1 | * | 11/2007 | Samoto et al. .......... 347/85 |
| 2007/0285478 | A1 | * | 12/2007 | Samoto et al. .......... 347/85 |
| 2008/0068679 | A1 |   | 3/2008  | Murai |
| 2011/0211234 | A1 | * | 9/2011  | Kozaki et al. ......... 358/474 |

FOREIGN PATENT DOCUMENTS

| JP | 2002-247291 A | 8/2002 |
| JP | 2008-078851 A | 4/2008 |
| JP | 2011-180366 A | 9/2011 |

* cited by examiner

*Primary Examiner* — Marivelisse Santiago Cordero
*Assistant Examiner* — Daryl Jackson
(74) *Attorney, Agent, or Firm* — Banner & Witcoff, Ltd.

(57) ABSTRACT

A cable wiring structure includes: a base member; a movable member configured to reciprocate in a first direction and in a second direction relative to the base member; a cable; a tension applying member, which is attached to the movable member and is movable in the first direction and in the second direction relative to the movable member, wherein when the movable member moves in the second direction, the tension applying member is coming in contact with an inner circumference of the curved portion to apply tension to the cable in response to movement of the movable member; and a load adjustment portion, which is configured to increase a load that is applied between the tension applying member and the movable member in a case where the movable member moves in the second direction as compared with a case where the movable member moves in the first direction.

16 Claims, 13 Drawing Sheets

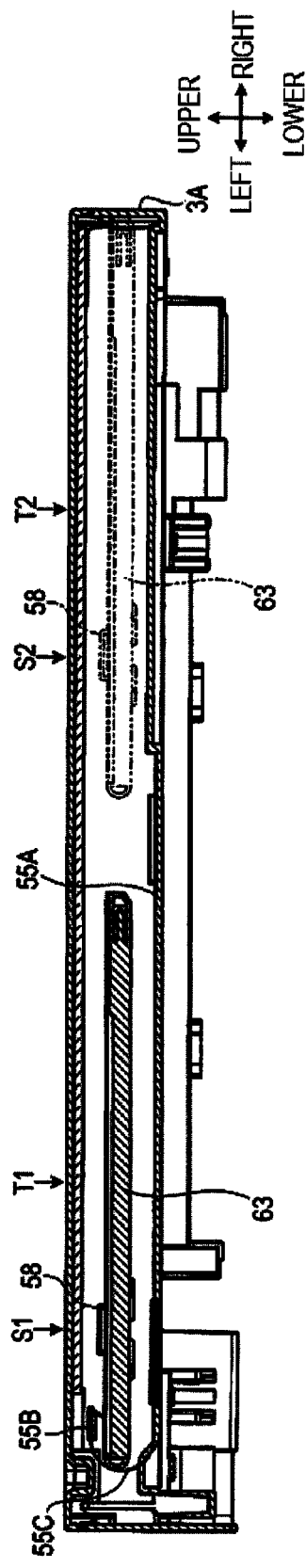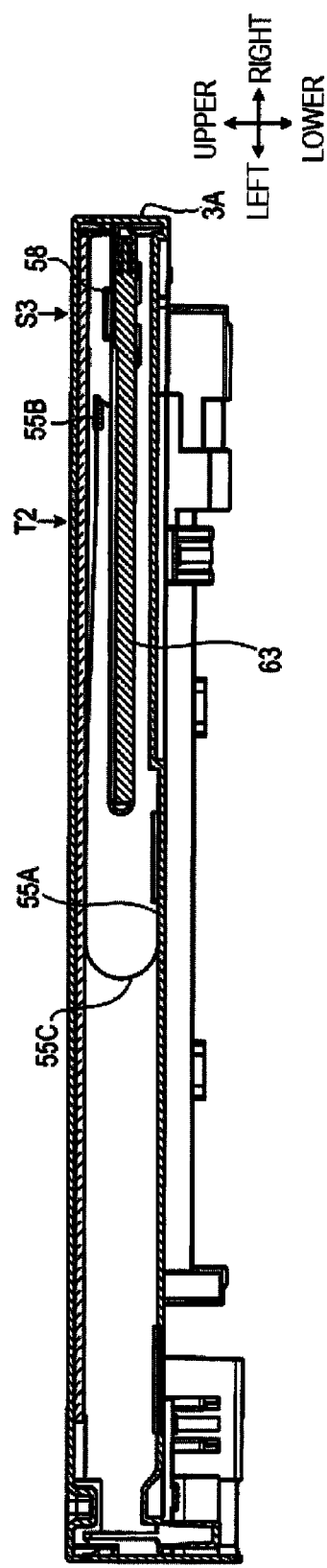
FIG.7A
FIG.7B

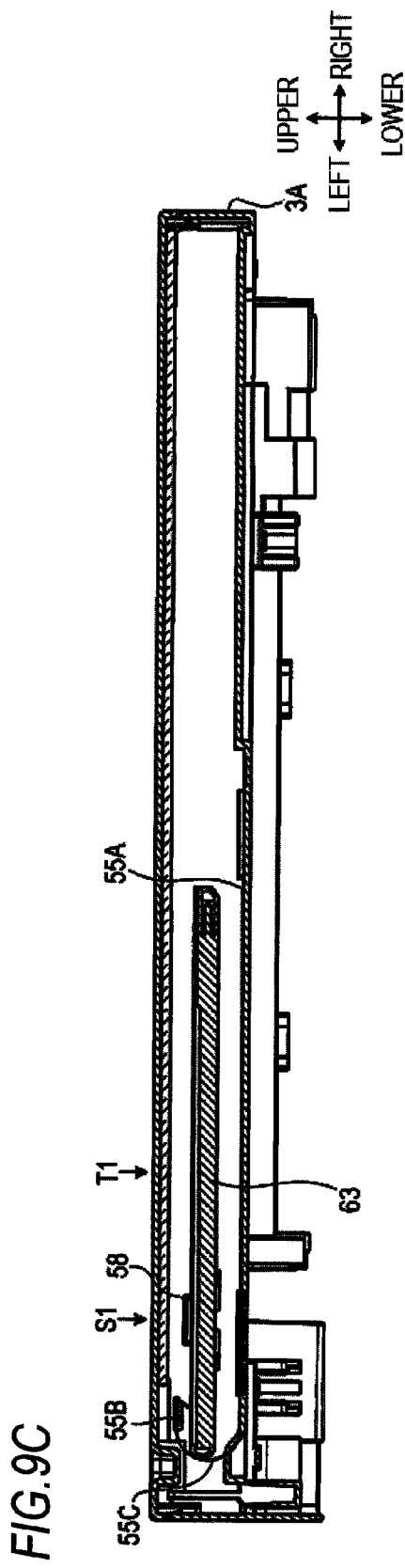

CABLE WIRING STRUCTURE AND IMAGE READING DEVICE

CROSS-REFERENCE TO RELATED APPLICATION

This application claims priority from Japanese Patent Application No. 2012-211166 filed on Sep. 25, 2012, the entire subject matter of which is incorporated herein by reference.

TECHNICAL FIELD

This disclosure relates to a cable wiring structure and an image reading device.

BACKGROUND

It is known that an image sensor provided in an image reading device and a recording head provided in an image forming device are mounted on a movable member called a carriage to reciprocate in the device. Further, in the case of wiring a cable between a base member and the movable member in this kind of device, it is also known that the cable is curved substantially in a U shape between both ends thereof, the one end is connected to the base member side, and the other end is connected to the movable member side.

In such a cable wiring structure, if a curved portion of the cable is located at a position that becomes the destination of the movable member, a compression force acts onto the cable in a region extending from a connection portion with the movable member to the curved portion. Therefore, if the cable does not have strength enough to endure the compression force, the cable may be buckled and damaged.

A buckling load (load that buckling occurs), as shown in Euler's expression of buckling load, grows larger as Young's modulus of the cable becomes higher. Therefore, for example, in the background art, the occurrence of buckling is suppressed by increasing the resultant Young's modulus of the cable through sticking of an elastic member (tension tape) to the cable.

SUMMARY

However, in the method for sticking the elastic member (tension tape) to the cable as described above, for example, if the cable is changed or there is an individual difference on the cable, the above-described resultant Young's modulus may not be high enough.

Therefore, in the background art, to surely prevent the above-described resultant Young's modulus from becoming smaller than an assumed one, it is necessary to strictly manage the Young's modulus of the cable including the tension tape, and such management is troublesome.

Through taking such trouble, respective cables may be inspected, and the cables having insufficient resultant Young's modulus may be removed as rejected products. In this case, however, there is a problem that yield is decreased.

Accordingly, this disclosure provides at least technology to suppress buckling of a cable, which is different from the technique in the related art.

Hereinafter, the configuration adopted in this disclosure will be described. A cable wiring structure of this disclosure comprises: a base member; a movable member configured to reciprocate in a first direction and in a second direction relative to the base member; a driving unit configured to reciprocate the movable member; a cable; a tension applying member; and a load adjustment portion. The cable has flexibility and includes a curved portion which has a curved shape and is located on a destination side of the movable member when the movable member moves in the second direction, and one end side of the cable is fixed to the base member and the other end side of the cable is connected to the movable member. The tension applying member is attached to the movable member and is movable in the first direction and in the second direction relative to the movable member, and when the movable member moves in the second direction, the tension applying member is coming in contact with an inner circumference of the curved portion to apply tension to the cable in response to movement of the movable member. The load adjustment portion is configured to increase a load that is applied between the tension applying member and the movable member in a case where the movable member moves in the second direction as compared with a case where the movable member moves in the first direction.

According to the cable wiring structure as configured above, the cable is displaced to follow the reciprocating movement of the mobbing body. At this time, the curved portion of the cable is also displaced. However, if the movable member moves in the second direction, the tension applying member comes in contact with the inner circumference of the curved portion and applies the tension to the cable in response to the movement of the movable member.

Accordingly, in the case where the movable member moves toward the curved portion of the cable, it moves in the second direction while pressing the curved portion in the second direction from the inner circumference side. Through this, the movable member does not excessively approach the curved portion, and this does not cause a trouble such that the cable is buckled with such an excessive approach. In particular, a cable often has a point (buckling point) that is easy to be buckled due to the coarse density of the Young's modulus or wounds at the time of production, and even with respect to such a cable, according to this disclosure, it is possible to suppress the occurrence of buckling at the buckling point when the movable member moves in the second direction.

Meanwhile, an image forming device comprises: a base member; a movable member including a carriage configured to reciprocate in a first direction and in a second direction relative to the base member and an image sensor attached to the carriage to read an image of a document when the carriage moves in the first direction; a driving unit configured to reciprocate the movable member; a cable, a tension applying member, and a load adjustment portion. The cable has flexibility and includes a curved portion which has a curved shape and is located on a destination side of the movable member when the movable member moves in the second direction wherein one end side of the cable is fixed to the base member and the other end side of the cable is connected to the image sensor. The tension applying member is attached to the movable member and is movable in the first direction and in the second direction relative to the movable member, wherein when the movable member moves in the second direction, the tension applying member is coming in contact with an inner circumference of the curved portion to apply tension to the cable in response to movement of the movable member. The load adjustment portion is configured to increase a load that is applied between the tension applying member and the movable member in a case where the movable member moves in the second direction as compared with a case where the movable member moves in the first direction.

According to the image reading device as configured above, the cable is displaced in a form to follow the reciprocating movement of the mobbing body. At this time, the curved portion of the cable is also displaced. However, if the movable member moves in the second direction, the tension applying member comes in contact with the inner circumference of the curved portion and applies the tension to the cable in response to the movement of the movable member.

Accordingly, in the case where the movable member moves toward the curved portion of the cable, it moves in the second direction while pressing the curved portion in the second direction from the inner circumference side. Through this, the movable member does not excessively approach the curved portion, and this does not cause a trouble such that the cable is buckled with such an excessive approach.

BRIEF DESCRIPTION OF THE DRAWINGS

The foregoing and additional features and characteristics of this disclosure will become more apparent from the following detailed descriptions considered with the reference to the accompanying drawings, wherein:

FIGS. 7A to 7C are explanatory views illustrating the displacement state of a spacer and a tension bar when an image sensor moves in a first direction;

FIGS. 9A to 9C are explanatory views illustrating the displacement state of a spacer and a tension bar when an image sensor moves in a second direction.

DETAILED DESCRIPTION

Figure 1:
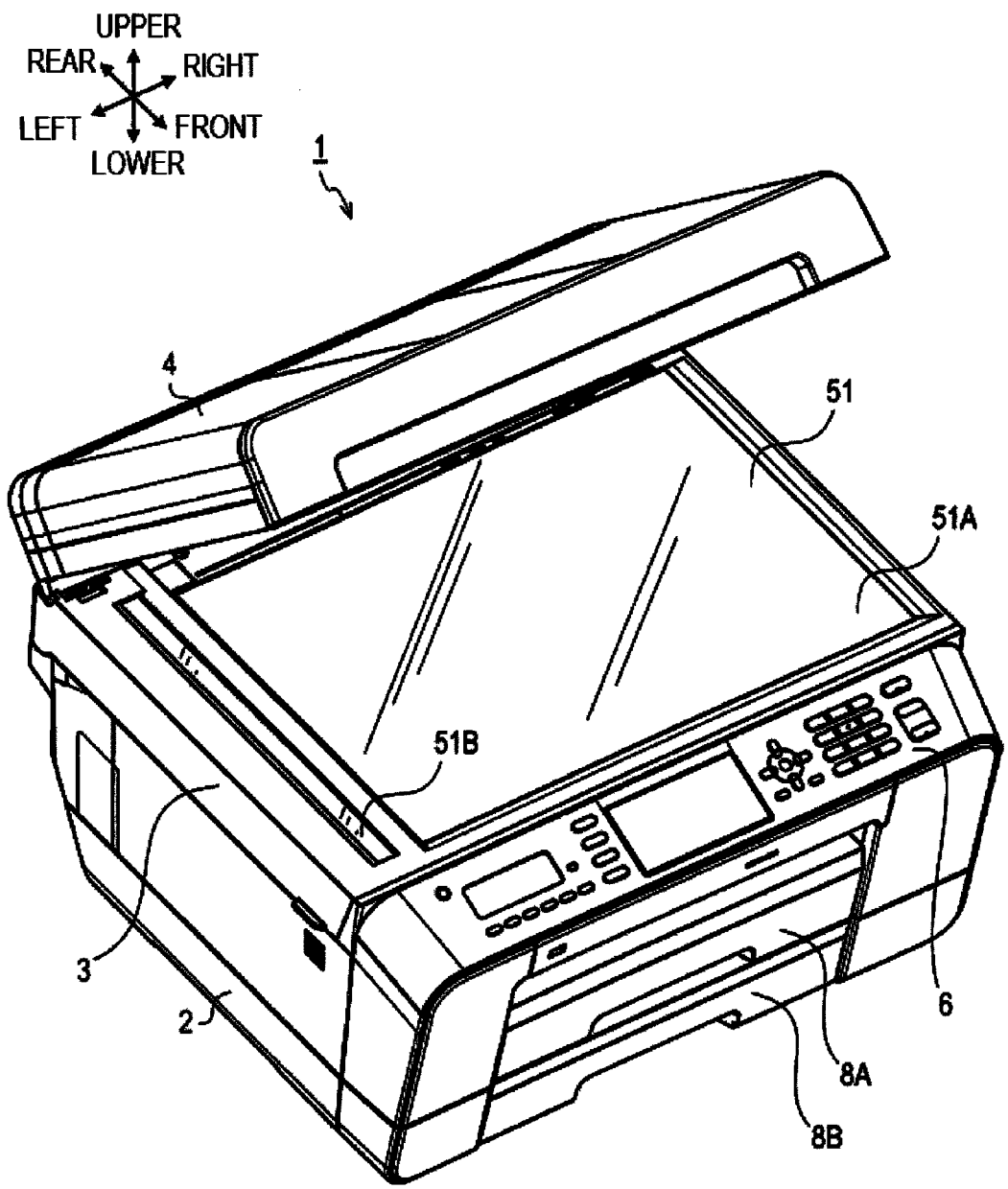
FIG. 1 is a perspective view illustrating an external appearance of the whole multifunction peripheral.

Hereinafter, embodiments of this disclosure will be described. In this embodiment, an exemplified cable wiring structure is provided in an image reading device. Further, it is exemplified that the image reading device is configured as a multifunction peripheral having other functions (e.g., print function, copy function, facsimile transmission/reception function, and the like) in addition to the function (scan function) as the image reading device. In the following description, for simple explanation of relative positional relations between respective portions of the multifunction peripheral, respective directions, that is, upper, lower, left, right, front, and rear directions, as described in the drawings will be used.

[Structure of a Multifunction Peripheral]

As illustrated in FIG. 1, a multifunction peripheral 1 includes a main body unit 2, a scanner unit 3 mounted on an upper side of the main body unit 2, and an ADF unit 4 mounted on an upper side of the scanner unit 3.

Among them, the scanner unit 3 has a configuration that corresponds to a flatbed image scanner. Further, the ADF unit 4 has a configuration that corresponds to an ADF (Automatic Document Feeder). The scanner unit 3 and the ADF unit 4 cooperate to function as an ADF type image scanner.

On an upper portion of the front side of the main body unit 2, an operation panel 6 that is operated by a user is provided.

On a lower portion of the main body unit 2, feeder cassettes 8A and 8B for receiving a recorded medium before printing are mounted.

Figure 2:
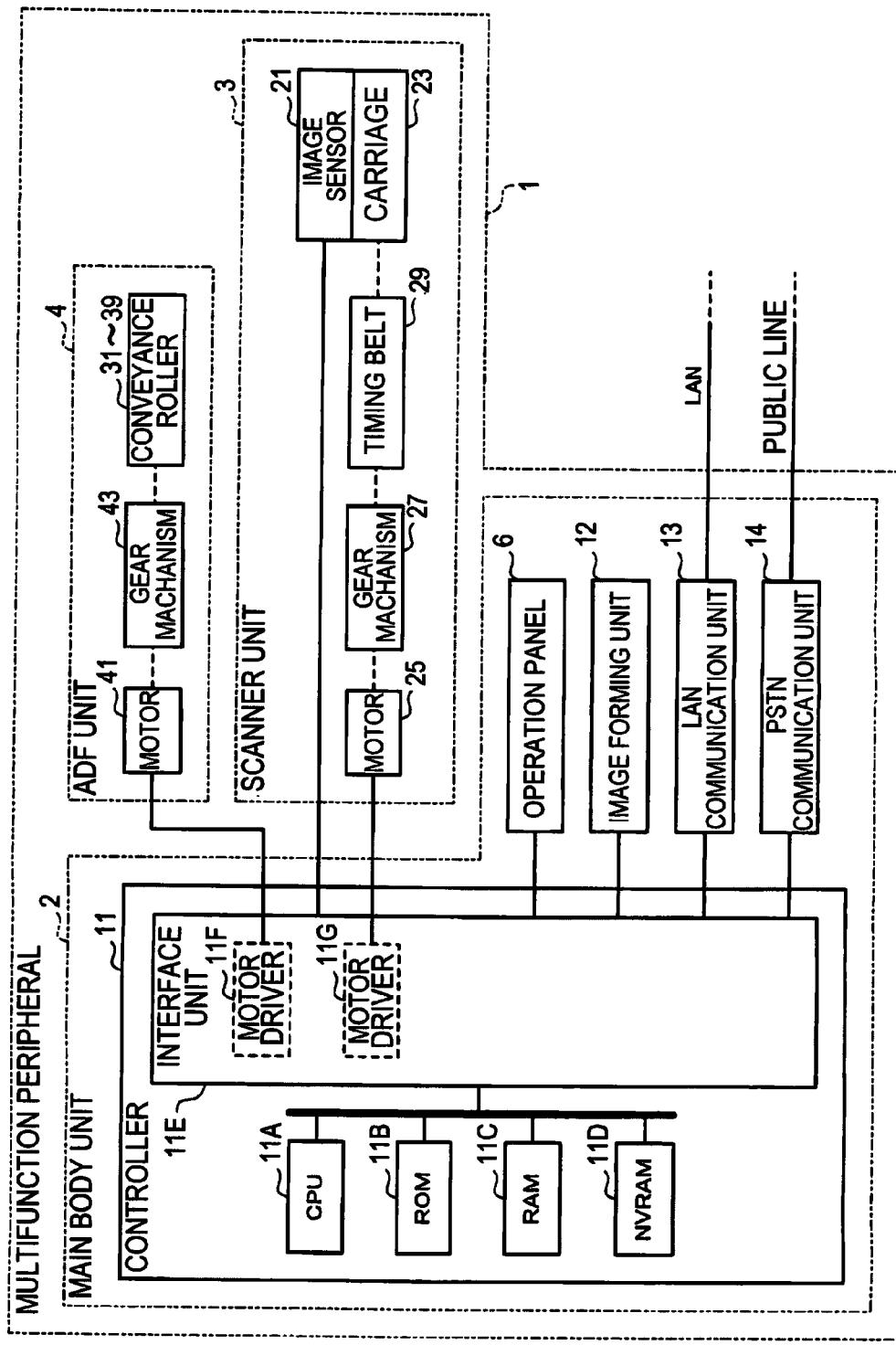
FIG. 2 is a block diagram illustrating the internal configuration of the multifunction peripheral.

In the main body unit 2, as illustrated in FIG. 2, a control unit 11, an image forming unit 12, a LAN communication unit 13, and a PSTN communication unit 14 are provided in addition to the above-described operation panel 6.

The control unit 11 includes a known CPU 11A, a ROM 11B, a RAM 11C, an NVRAM 11D, and an interface unit 11E. The CPU 11A executes a predetermined process according to a control program stored in the ROM 11B or the RAM 11C, and thus the control of respective units of the multifunction peripheral 1 is executed.

The image forming unit 12 is provided with an electrographic or ink jet print mechanism. The LAN communication unit 13 includes a communication interface device corresponding to wireless LAN, and a communication interface device corresponding to wire LAN. The PSTN communication unit 14 includes various kinds of devices that are necessary to connect to the public switched telephone network (PSTN).

In the operation panel 6, input devices (e.g., a touch panel, various kinds of buttons, and switches) that is operated when a user provides various kinds of commands to the multifunction peripheral, and an output device (e.g., liquid crystal display device) for notifying a user of the operating state of the multifunction peripheral 1.

The scanner unit 3 includes a line type image sensor 21 having a plurality of reading elements, and a carriage 23 supporting the image sensor 21. The image sensor 21 and the carriage 23 correspond to an example of the movable member that is mentioned in this disclosure.

Further, in the scanner unit 3, a motor 25, a gear mechanism 27 that is driven by the motor 25, and a timing belt 29 that is driven by the gear mechanism 27 are provided, and the above-described carriage 23 is connected to the timing belt 29. The motor 25 receives a driving signal from a motor driver 11G provided in an interface unit 11E of the control unit 11 to operate. The motor 25, the gear mechanism 27, the timing belt 29, and the motor driver 11G correspond to an example of the driving unit that is mentioned in this disclosure.

The power that is generated by the motor 25 is transmitted to the carriage 23 through the gear mechanism 27 and the timing belt 29. As a result, the carriage 23 moves in the right direction (corresponding to an example of the first direction that is mentioned in this disclosure) and in the left direction (corresponding to an example of the second direction that is mentioned in this disclosure) as shown in the drawing.

The ADF unit 4 includes conveyance rollers 31 to 39 conveying the document along a predetermined conveyance path. Further, in the ADF unit 4, a motor 41 and a gear mechanism 43 that is driven by the motor 41 are provided. The motor 41 receives the driving signal from the motor driver 11G provided in the interface unit 11E of the control unit 11 to operate.

The power that is generated by the motor 41 is transmitted to the conveyance rollers 31 to 39 through the gear mechanism 43. On the other hand, some of the conveyance rollers 31 to 39 become driving rollers that are directly driven by the gear mechanism 43, and other rollers become driven rollers that are rotated to follow the driving rollers or the document. As the ADF unit 4 cooperates with the scanner unit 3, the multifunction peripheral 1 functions as an ADF type image scanner.

[Details of the Scanner Unit]

As illustrated in FIG. 1, on an upper portion of the scanner unit 3, a platen glass 51 is attached. An upper surface of the platen glass 51 is partitioned into a first area 51A and a second area 51B. The first area 51A is a part where the document is placed (corresponding to an example of the document placement portion that is mentioned in this disclosure) when the multifunction peripheral 1 is used as the flatbed image scanner. The second area 51B is a part through which the document that is conveyed by the ADF unit 4 passes while coming in contact with the second area 51B when the multifunction peripheral 1 is used as the ADF type image scanner. On the other hand, in this embodiment, the first area 51A and the second area 51B are configured using one sheet of platen glass 53. However, the first area 51A and the second area 51B may be configured by different platen glasses.

Figure 3:
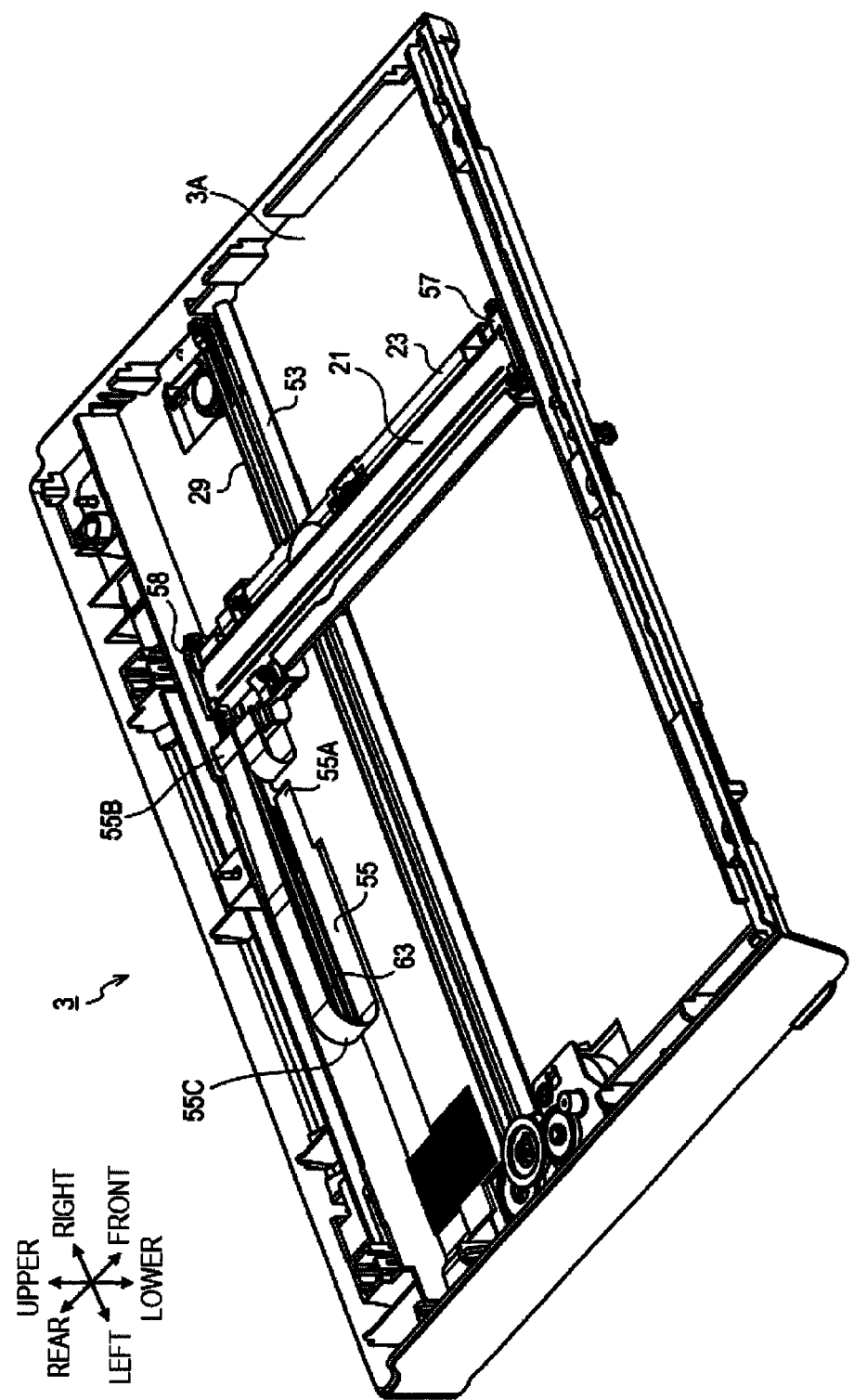
FIG. 3 is a perspective view illustrating an internal structure of a scanner unit.

In the scanner unit 3, as illustrated in FIG. 3, the above-described image sensor 21, the carriage 23, and the timing belt 29 are provided.

The image sensor 21 is configured by a CIS (Contact Image Sensor). A plurality of reading elements provided in the image sensor 21 are arranged in the front/rear direction in the multifunction peripheral 1. Hereinafter, the front/rear direction that is the arrangement direction of the reading elements is called a main scanning direction.

On an upper surface side of the base member 3A that is provided in the scanner unit 3, a guide portion 53 that extends in the left/right direction is provided. If the timing belt is driven, the carriage 23 moves in the left/right direction relatively to the base member 3A along the guide portion 53. Hereinafter, the left/right direction that is the moving direction of the image sensor 21 and the carriage 23 is called a sub-scanning direction.

In the scanner unit 3, a cable 55 is provided at a position that is the rear of the device than the timing belt 29. This cable 22 is a belt-shaped cable having flexibility, and in this embodiment, a flexible flat cable (FFC) is adopted. One end 55A of the cable 55 is fixed to the base member 3A, and the other end 55B of the cable 55 is connected to the image sensor 21.

A curved portion 55C, in which the cable is curved substantially in a U shape, is formed between both the ends of the cable 55. The curved portion 55C is located on the side of the destination of the movement of the carriage 23 when the carriage 23 moves in the left direction.

Figure 4:
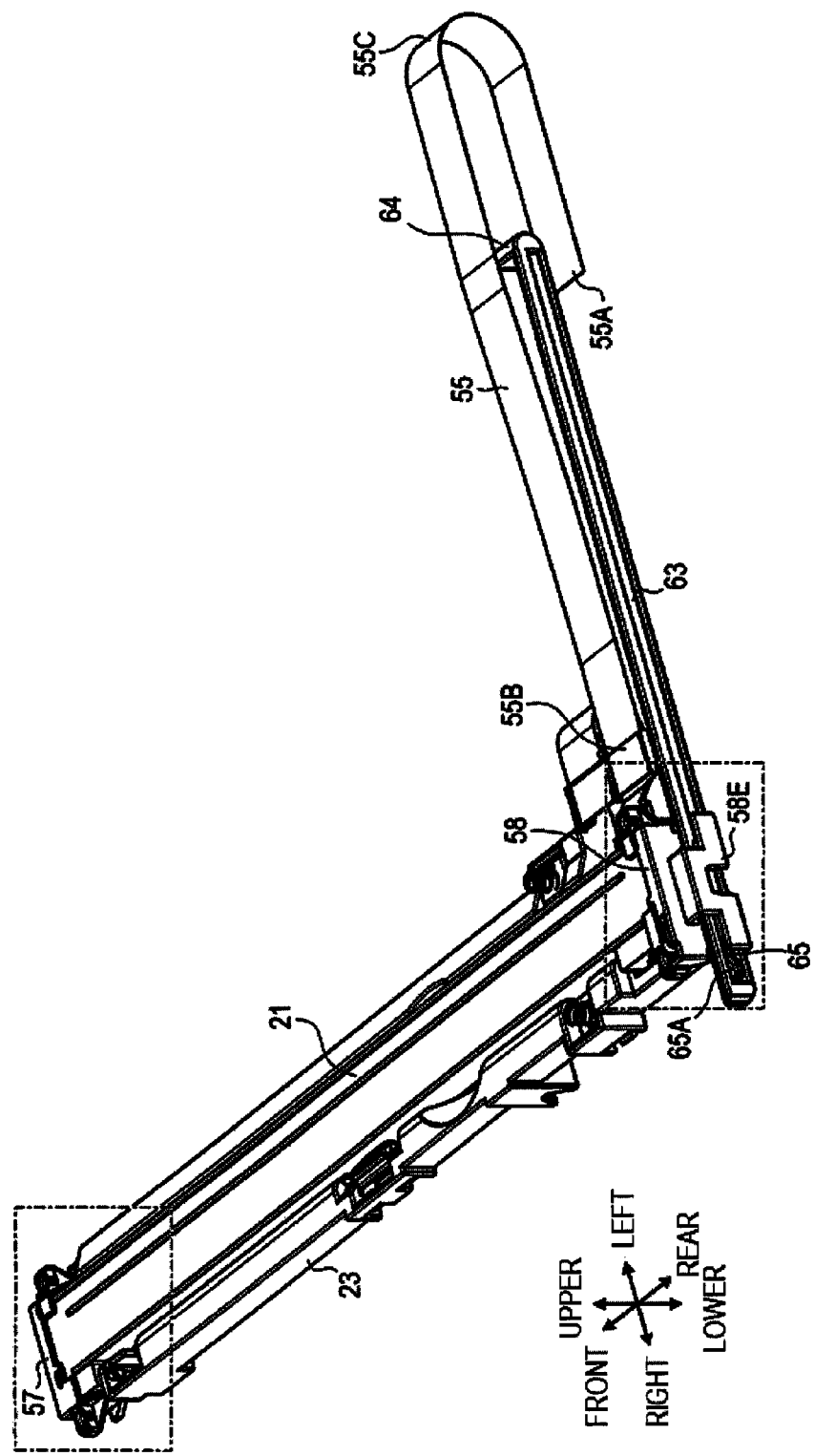
FIG. 4 is a perspective view illustrating an extracted part of the internal structure of the scanner unit.
Figure 5A:
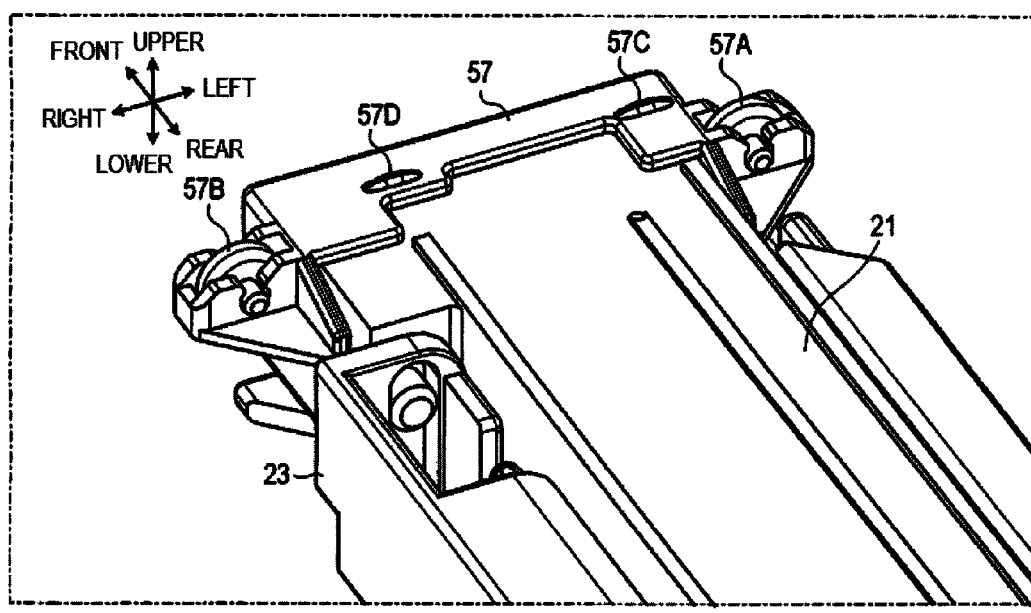
FIGS. 5A and 5B are perspective views of the vicinity of a spacer.
Figure 5B:
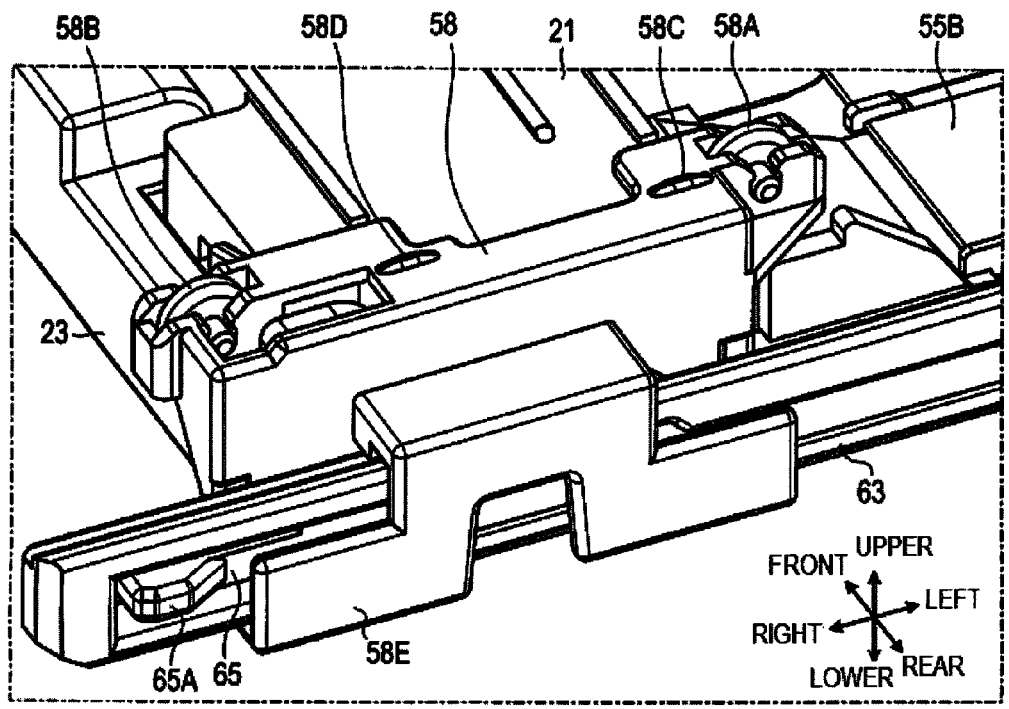

As shown in FIGS. 3 and 4, a spacer 57 is attached to the front end of the image sensor 21, and a spacer 58 is attached to the rear end of the image sensor 21. The spacers 57 and 58 are members that move together with the image sensor 21 and the carriage 23, and they correspond to an example of the movable member mentioned in this disclosure. As shown in FIGS. 5A and 5B, the spacers 57 and 58 include rolling wheels 57A, 57B, 58A, and 58B provided on upper end sides thereof. Further, in a place that is between the rolling wheels 57A and 57B at the upper end of the spacer 57, two convex portions 57C and 57D are formed. In a place that is between the rolling wheels 58A and 58B at the upper end of the spacer 58, two convex portions 58C and 58D are formed. Upper ends of the convex portions 57C, 57D, 58C, and 58D are set to have the same height as upper ends of the rolling wheels 57A, 57B, 58A, and 58D.

Figure 6:
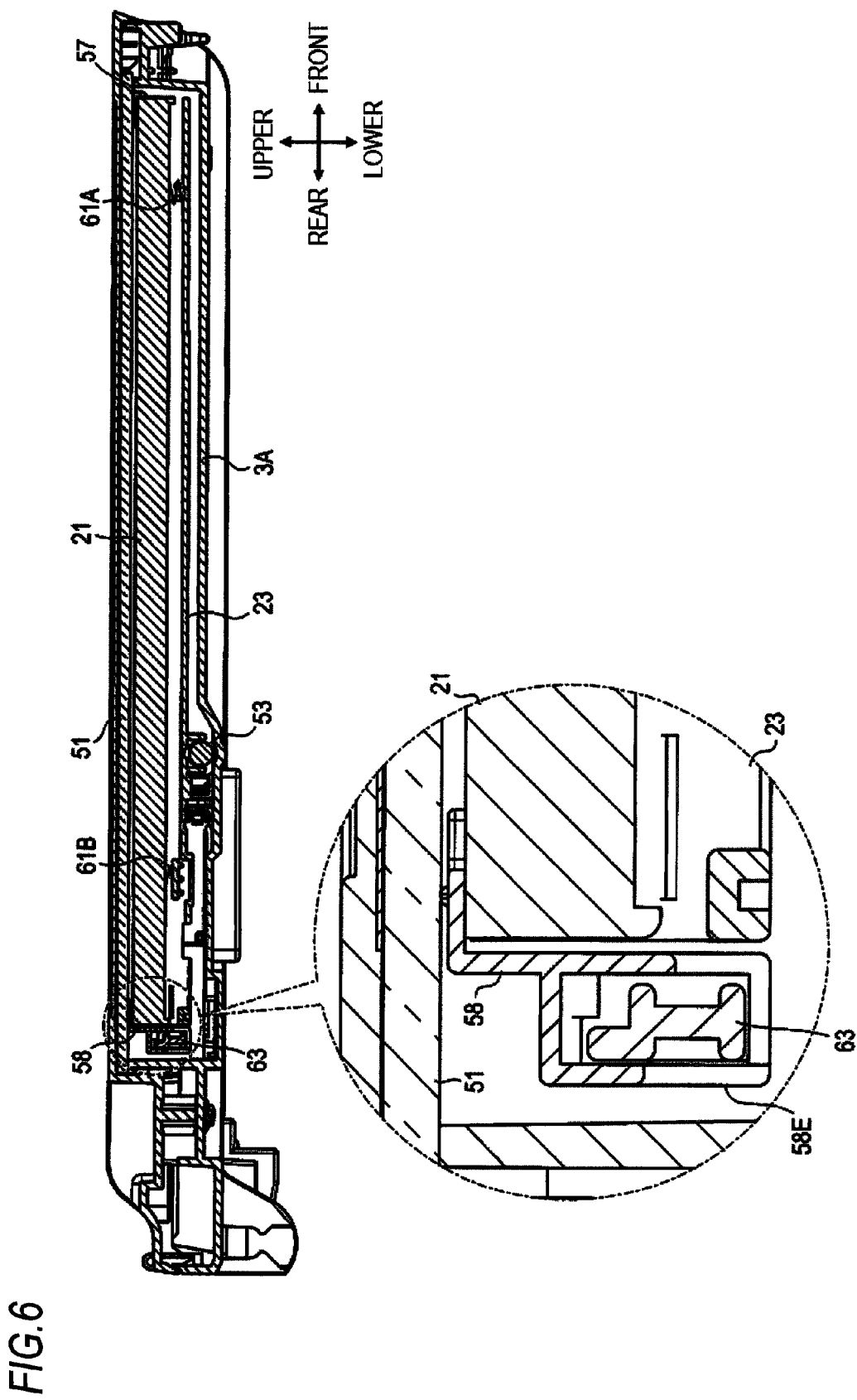
FIG. 6 is a longitudinal cross-sectional view illustrating the internal structure of a scanner unit and an enlarged part thereof.

The image sensor 21 is supported on the carriage 23 in a state where its upward/downward movement is possible relative to the carriage 23. As shown in FIG. 6, compression springs 61A and 61B are interposed between the image sensor 21 and the carriage 23, and thus the image sensor 21 is urged upwardly. Therefore, the spacers 57 and 58 are urged upwardly together with the image sensor 21, and the rolling wheels 57A, 57B, 58A, and 50B are in a state where they come in pressure contact with a lower surface of the platen glass 51.

Through this, even if the carriage 23 somewhat moves upward/downward when the carriage 23 moves in the left/right direction, the image sensor 21 and the spacers 57 and 58 move in the left/right directions in a state where the rolling wheels 57A, 57B, 58A, and 58B and the convex portions 57C, 57D, 58C, and 58D are kept in pressure contact with the lower surface of the platen glass 51. As a result, the distance between the image sensor 21 and the glass 51 is kept constant. On the other hand, as regards the rolling wheels 57A, 57B, 58A, and 58B and the convex portions 57C, 57D, 58C, and 58D, the rolling wheels 57A, 57B, 58A, and 58B may be omitted and the convex portions 57C, 57D, 58C, and 58D may be only provided. By contrast, the convex portions 57C, 57D, 58C, and 58D may be omitted and the rolling wheels 57A, 57B, 58A, and 58B may be only provided.

As shown in FIGS. 3 to 6, a tension bar 63 (corresponding to an example of the tension applying member and pressure member mentioned in this disclosure) is attached to the spacer 58. The tension bar 63 passes through a holding portion 58E provided on the spacer 58, and it is kept in a state where is movable in the left/right direction relative to the spacer 58.

As clearly shown in an enlarged part of FIG. 6, the tension bar 63 and the image sensor 21 are at positions where they do not overlap each other as seen from an upper side (i.e., in a plan view, as seen from a vertical direction), and are at positions where they overlap each other in a side view from the rear side. Through this, thinning of the dimensions in the upper/lower direction can be sought as compared with the case where the tension bar 63 and the image sensor 21 are at the positions where they overlap each other as seen from the upper side.

At the left end of the tension bar 63, a contact portion 64 is provided, which comes in internal contact with the curved portion 55C of the cable 55 when the tension bar 63 is displaced in the left direction. The contact portion 64 has a curved surface that is convex in the left direction. Since the curved surface comes in contact with the inner circumference of the curved portion 55C, excessive force is prevented from being applied to the cable 55.

On the other hand, at the right end of the tension bar 63, as shown in FIG. 5B, an elastic extension piece 65 is provided, which is shaped to extend from the left end side as the base end to the right side, and has a right end that is displaced in the front/rear direction if the extension part is elastically deformed. At the right end of the elastic extension piece 65, a convex portion 65A that projects toward the rear side of the device is formed.

If the tension bar 63 moves up to the position where the convex portion 65A and the holding portion 58E overlap each other in the front/rear direction when the tension bar 63 is displaced in the left direction, the convex portion 65A comes in pressure contact with the holding portion 58E. On the other hand, the convex portion 65A corresponds to an example of a pressure contact portion that is mentioned in this disclosure, and the holding portion 58E corresponds to an example of a pressed contact portion.

If the convex portion 65A does not come in pressure contact with the holding portion 58E, the tension bar 63 is in a state where it is displaced in the left/right direction relative to the spacer 58 (hereinafter, this state is called an unlock state) only by applying force that is lower than a predetermined threshold value to the tension bar 63. On the other hand, if the convex portion 65A comes in pressure contact with the holding portion 58E, the tension bar 63 is to be a state where it is not displaced in the left/right direction relative to the spacer 58 (hereinafter, this state is called a lock state) only by applying the force that is lower than the predetermined threshold value to the tension bar 63.

If the force that is higher than the predetermined threshold value is applied to the tension bar 63 even in the case where the tension bar 63 is in a lock state, the tension bar 63 can be displaced in the right direction. Through this, if the tension bar 63 moves up to the position where the convex portion 65A and the holding portion 58E do not overlap each other, the convex portion 65A and the holding portion 58E become in a state where they do not come in pressure contact with each other, that is, in an unlock state as described above.

Each of the convex portion 65A and the holding portion 58E configures a lock mechanism (corresponding to an example of the lock mechanism or the load adjustment portion that is mentioned in this disclosure) that is shifted to either of the lock state and the unlock state according to the position of the tension bar 63.

[Behavior of the Tension Bar]

If the multifunction peripheral 1 as configured above is used as the flatbed image scanner, the carriage 23 makes forward movement from an initial position that leans to the left end side of the movable range to the right side, and if the carriage 23 reaches the right end of the movable range, the carriage makes return movement in the left direction to return to the initial position. At this time, the image sensor 21 reads an image of a document that is placed on the upper surface of the platen glass 51 in a period when the carriage 23 makes forward movement to the right side.

When the carriage 23 is at the initial position, as shown in FIG. 7A, the spacer 58 is at position S1, and the tension bar 63 is at position T1. In the following description, each of the position of the spacer 58 and the position of the tension bar 63 is set to be shown at a position that is substantially the center in the left/right direction.

If the carriage 23 starts forward movement and is displaced from the initial position to the right side, the spacer 58 and the tension bar 63 are also displace in the right direction together with the carriage 23. Further, if the spacer 58 that moves together with the carriage 23 reaches the position S2, the tension bar 63 reaches position T2. At this time, the right end of the tension bar 63 comes in contact with the base member 3A. Through this, the tension bar 63 is to be a state where it is unable to be displaced further in the right direction.

However, the tension bar 63 has a structure that can be displaced in the left/right direction relative to the spacer 58, and even if the right end of the tension bar 63 comes in contact with the base member 3A, the spacer 58 can be further displaced in the right direction. At this time, the above-described lock mechanism 69 is in an unlock state, and it is displaced against the spacer 58 only by applying slight force to the tension bar 63.

Therefore, even if the right end of the tension bar 63 comes in contact with the base member 3A, the forward movement of the carriage 23 is not disturbed, and the carriage 23 continues movement in the right direction extremely smoothly. Further, in accordance with the displacement of the carriage 23, the spacer 58 continues movement in the right direction, and reaches the position S3 as shown in FIG. 7B.

The image sensor 21 reads the image of the document that is placed on the upper surface of the platen glass 51 in a period when the spacer 58 is displaced from position S1 to position S3. In the reading period, the right end of the tension bar 63 comes in contact with the base member 3A, but as described above, the carriage 23 continues movement in the right direction extremely smoothly, and thus the contact between the tension bar 63 and the base member 3A does not exert a bad influence on the reading quality of the image.

Figure 7C:
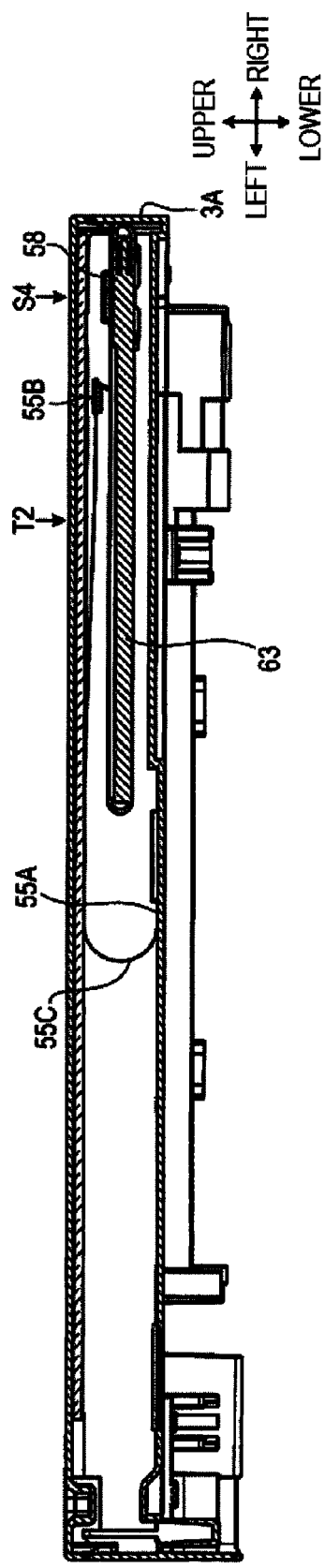

Even after the spacer 58 reaches the position S3, the carriage 23 continues movement in the right direction. Further, in accordance with the displacement of the carriage 23, the spacer 58 continues movement in the right direction, and reaches the position S4 as shown in FIG. 7C. On the other hand, since the tension bar 63 is unable to be displaced in the right direction, it is not displaced from the position T2.

Figure 8A:
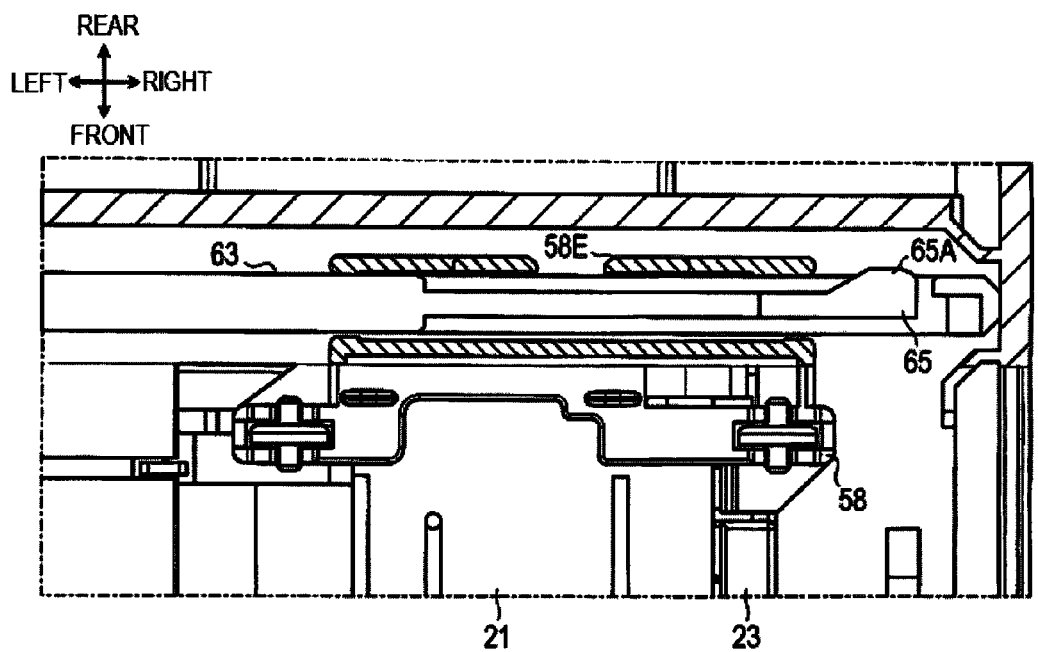
FIGS. 8A and 8B are explanatory views illustrating the behavior of a lock mechanism.
Figure 8B:
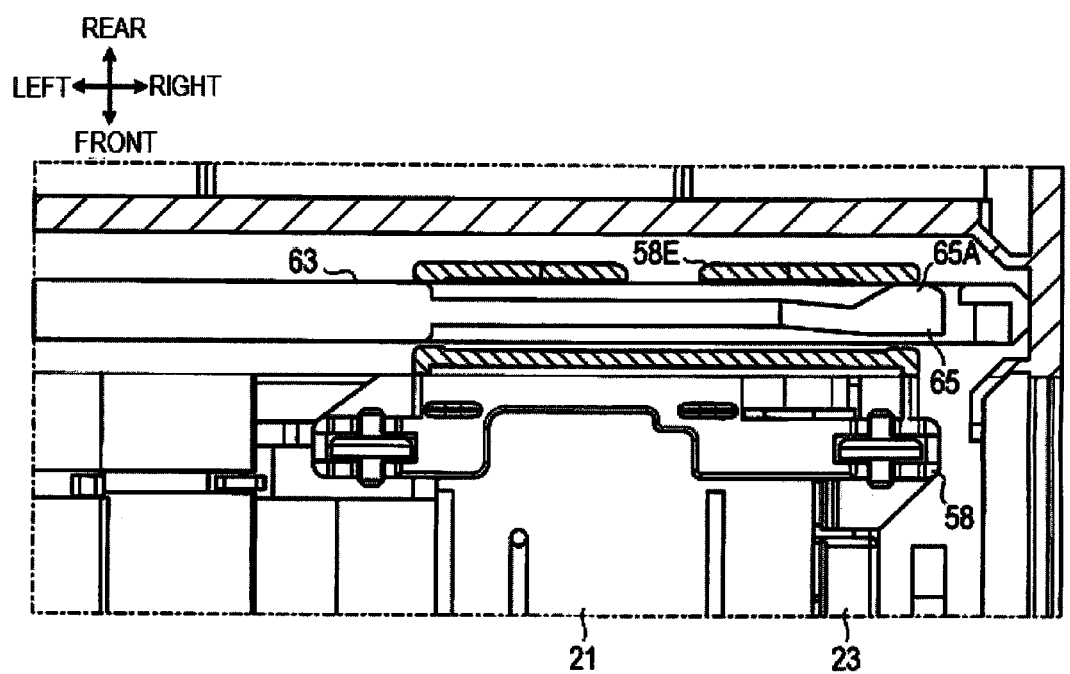

When the spacer 58 is displaced from the position S3 as shown in FIG. 8A to the position S4 as shown in FIG. 8B, the holding portion 58E of the spacer 58 comes in contact with the convex portion 65A of the elastic extension piece 65. Through this, the tension bar 63 is displaced to the position S4 while elastically deforming the elastic extension piece 65, and the lock mechanism 69 is to be the lock state as described above.

When the lock mechanism 69 is shifted from the unlock state to the lock state, sliding resistance (frictional resistance) that acts between the spacer 58 and the tension bar 63 is increased. Therefore, a braking force acts on the carriage 23, and the speed of the carriage is somewhat reduced. However, at this time, the image reading is completed, and the speed reduction of the carriage 23 does not exert a bad influence on the reading quality of the image.

Figure 9A:
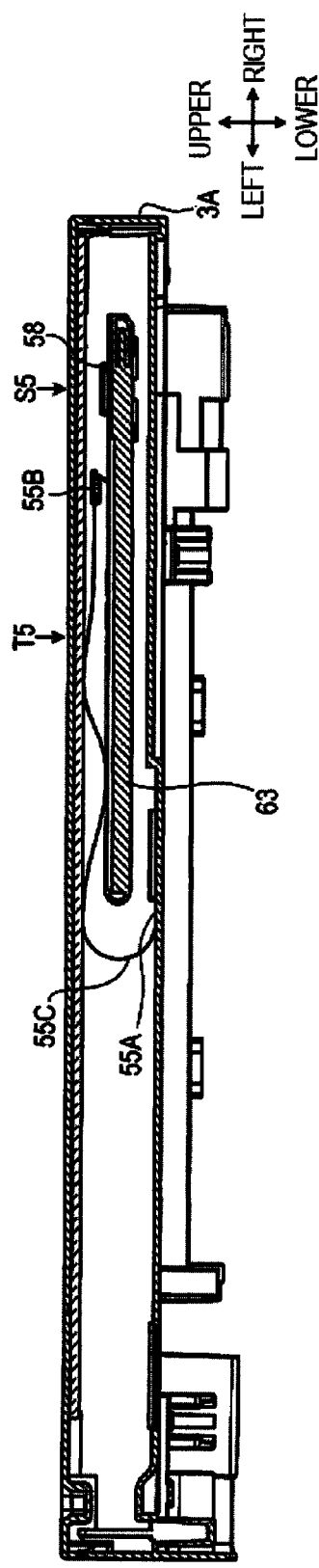

After the spacer 58 reaches the position S4, the carriage 23 starts return movement and is displaced in the left direction. At the time when the carriage 23 slightly moves in the left direction, and as shown in FIG. 9A, the spacer 58 is displaced to the position S5, and the tension bar 63 is displaced to the position T5, the contact portion 64 that is at the left end of the tension bar 63 does not reach the cable 55.

At this time, depending on the deflection state of the cable 55, the cable 55 comes in contact with the lower surface of the platen glass 51, and the frictional resistance acts between the contact points. Therefore, only by displacing the other end 55B of the cable 55 in the left direction together with the carriage 23, the curved portion 55C of the cable 55 is unable to be pushed in the left direction, and in this case, the deflection of the cable 55 between the curved portion 55C and the other end 55B is increased. If the deflection is further increased, it may cause the buckling of the cable 55.

However, in the multifunction peripheral 1, if the carriage 23 is further displaced in the left direction, at a certain position, the contact portion 64 that is at the left end of the tension bar 63 comes in internal contact with the curved portion 55C of the cable 55. This is because the movement distance of the part of the curved portion 55C is shorter than the movement distance of the carriage 23 in a predetermined period.

More specifically, since the curved portion 55C of the cable 55 is curved substantially in a "U" shape, when the carriage 23 moves for a predetermined distance in the left direction, the movement distance of the curved portion 55C becomes about a half of the movement distance of the carriage 23 even though the deflection of the cable 55 between the other end 55B of the cable 55 and the curved portion 55C does not occur. As described above, the deflection of the cable 55 between the other end 55B of the cable 55 and the curved portion 55C may actually occur, and in this case, the movement distance of the curved portion 55C is further shortened. Accordingly, if the tension bar 63 moves together with the carriage 23, the contact portion 64 that is at the left end of the tension bar 63 catches up with the curved portion 55C of the cable 55, which moves for the distance that is less than a half of the movement distance of the contact portion 64 and comes in internal contact with the curved portion 55C.

Figure 9B:
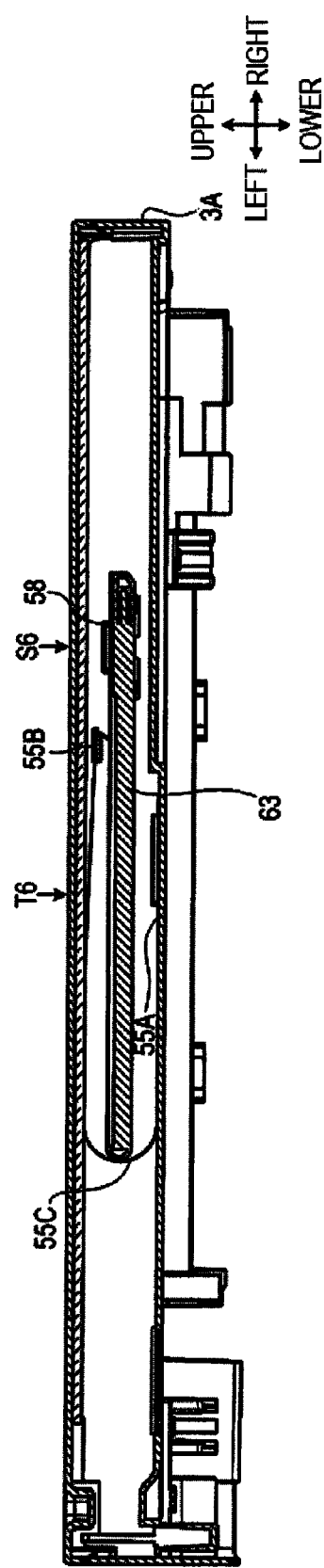

Thereafter, as shown in FIG. 9B, when the tension bar 63 moves in the left direction together with the carriage 23, the contact portion 64 acts to push the curved portion 55C of the cable 55 in the left direction. Accordingly, the tension bar 63 applies tension to the cable 55, and thus the buckling of the cable 55 can be prevented or suppressed. That is, even if the cable 55 has a point (buckling point) that is easy to be buckled due to the coarse density of the Young's modulus or wounds at the time of production, the tension bar 63 moves while applying tension to the cable 55, and thus the occurrence of buckling at the buckling point can be suppressed.

As shown in FIG. 9B, at the time when the spacer 58 is displaced to the position S6 and the tension bar 63 is displaced to the position T6, the cable 55 is to be a state where unnecessary deflection is completely prolonged. Even in this state, the carriage 23 continues movement in the left direction, and thus the spacer 58 also continues movement in the left direction. However, a pressing force from the curved portion 55C acts on the contact portion 64 that is at the left end of the tension bar 63, and the tension bar 63 is to be a state where its displacement in the left direction is disturbed.

Therefore, the tension bar 63 continues the displacement in the left direction, but the displacement amount becomes smaller than that of the spacer 58. In this state, the spacer 58 is displaced in the left direction relative to the tension bar 63, and thus the force that acts from the curved portion 55C to the tension bar 63 is gradually increased. At the time when the force exceeds a predetermined level, the elastic extension piece 65 of the tension bar 63 is displaced to the position where it separates from the holding portion 58E, and the lock mechanism 69 is to be an unlock state as described above. Accordingly, according to the lock mechanism 69, the lock can be released in response to the displacement of the carriage 23 even if a dedicated mechanism to release the lock is not provided.

When the lock mechanism 69 is shifted from the lock state to the unlock state, the sliding resistance (frictional resistance) that acts between the spacer 58 and the tension bar 63 is reduced. Therefore, the load that is applied to the carriage 23 is changed. However, at this time, the image reading is not performed, and thus the change of the load applied to the carriage 23 does not exert a bad influence on the reading quality of the image.

Thereafter, the carriage 23 continues the movement in the left direction, and as shown in FIG. 9C, it returns to the initial position. At this time, the spacer 58 also moves in the left direction together with the carriage 23. The tension bar 63 moves in the left direction while pressing the curved portion 55C, and simultaneously receives the force from the curved portion 55C to be displaced in the right direction relative to the spacer 58. Therefore, the displacement amount of the tension bar 63 in the left direction becomes smaller than that of the spacer 58, and the tension bar 63 and the spacer 58 return to their initial positions while changing their relative positions.

[Effects]

As described above, according to the multifunction peripheral 1, when the image sensor 21 and the carriage 23 move in the left direction, the tension bar 63 comes in contact with the inner circumference of the curved portion 55C to apply the tension to the cable 55. The image sensor 21 and the carriage 23 do not excessively approach the curved portion 55C, and this does not cause a trouble such that the cable 55 is buckled with such excessive approach.

When the image sensor 21 and the carriage 23 move in the right direction, the lock mechanism 69 is to be an unlock state, and the load that is applied between the tension bar 63 and the spacer 58 is decreased. On the other hand, if the image sensor 21 and the carriage 23 move in the left direction, the lock mechanism 69 is to be a lock state, and the load that is applied between the tension bar 63 and the spacer 58 is increased.

Accordingly, if the image sensor 21 and the carriage 23 move in the left direction, the tension bar 63 can appropriately apply the tension to the cable 55. Further, if the image sensor 21 and the carriage 23 move in the right direction, unnecessary load is not applied between the tension bar 63 and the spacer 58, and thus it can be prevented or suppressed to exert a bad influence on the quality of the image that is read by the image sensor 21.

That is, according to the lock mechanism 69, when the image sensor 21 and the carriage 23 are reciprocated, the tension bar 63 is displaced more easily in the left/right direction in the case of the forward movement, and the tension bar 63 is not displaced easily in the left/right direction in the case of the return movement. Accordingly, unlike the case where the lock mechanism 69 is not provided, the tension that acts on the cable 55 during the return movement is not decreased due to the reason that the tension bar 63 is designed to be easily displaced in the left/right direction during the forward movement. Further, the tension bar 63 does not disturb the movement of the carriage 23 during the forward movement due to the reason that the tension bar 63 is designed not to be easily displaced in the left/right direction during the return movement.

Other Embodiments

Although the embodiments of this disclosure have been described, this disclosure is not limited to the above-described detailed embodiments, and it may be embodied in various forms.

For example, in the above-described embodiment, the structure is exemplified as the lock mechanism 69, in which the convex portion 65A provided on the side of the tension bar 63 comes in pressure contact with the holding portion 58E provided on the side of the spacer 58. However, a pressure contact portion that is elastically supported on the side of the holding portion 58E may be provided, and the pressure contact portion may be configured to come in pressure contact with the side of the tension bar 63.

Further, in addition to the structure in which the load that acts on the tension bar 63 is changed according to the pressure contact as described above, a structure may be adopted, in which an engaging portion is provided in one of the spacer 58 and the tension bar 63, an engaged portion is provided in the other thereof, and the load is changed depending on whether to engage the both portions. That is, in the structure that changes the load that acts between the movable member (e.g., spacer 58) and the tension applying member (e.g., tension bar 63), it is optional whether to take a technique called pressure contact, a technique called engagement, or other techniques.

In the above-described embodiment, it is exemplified that the image sensor 21 and the carriage 23 provided in the multifunction peripheral 1 correspond to the movable member, and the cable 55 between the image sensor 21 and the base member 3A corresponds to the wiring. However, the cable wiring structure according to this disclosure can also be adopted in devices other than the image reading device.

For example, in the image forming device provided with the recording head that reciprocates relative to the base member, the configuration of this disclosure may be adopted when the cable is wired between the base member and the recording head. Further, even in a device other than a device of an image processing system called an image forming device or an image reading device, for example, in a device provided with the movable member that reciprocates relative to the base member, such as a machine tool, the configuration of this disclosure can be adopted.

Further, in the above-described embodiment, the image reading device that is configured through the multifunction peripheral is presented as an example of the image reading device. However, it is optional whether the image reading device is configured through the multifunction peripheral, and the configuration according to this disclosure may be adopted in an image reading device, a copy machine, or a facsimile having a single function.

What is claimed is:

1. A cable wiring structure comprising:
a base member;
a movable member configured to reciprocate in a first direction and in a second direction, which is opposite to the first direction, relative to the base member;
a driving unit configured to reciprocate the movable member;
a cable, which has flexibility and comprises a curved portion which has a curved shape and is convex toward the second direction, wherein one end of the cable is fixed to the base member and the other end of the cable is connected to the movable member;
a tension applying member, which is attached to the movable member and is movable in the first direction and in the second direction relative to the movable member, wherein, when the movable member moves in the second direction, the tension applying member comes in contact with an inner circumference of the curved portion; and
a load adjustment portion, which is configured to increase a load that is applied between the tension applying member and the movable member in a case where the movable member moves in the second direction as compared with a case where the movable member moves in the first direction;
wherein the tension applying member comprises a pressing member, which is mounted on the movable member and extends from the movable member toward the curved portion so that a front end thereof comes in internal contact with the curved portion, and
wherein, when the movable member moves in the second direction, the tension applying member makes the front end of the pressing member come in contact with an inner circumference side of the curved portion to displace the pressing member relative to the movable member by a force that acts from the curved portion to the pressing member, so that the tension applying member approaches the curved portion relative to the moving member and moves the moving member in the second direction to thus apply the tension to the cable.

2. The cable wiring structure according to claim 1, wherein the load adjustment portion is a lock mechanism that temporarily fixes the tension applying member and the movable member to a predetermined position.

3. The cable wiring structure according to claim 2, wherein the lock mechanism has one of a structure, in which a pressing contact portion disposed on one of the tension applying member and the movable member comes in pressure contact with a pressed contact portion disposed on the other thereof, and a structure, in which an engaging portion disposed on the one thereof is engaged with an engaged portion disposed on the other thereof.

4. The cable wiring structure according to claim 3, wherein the lock mechanism is configured to release a lock state when a force that acts from the curved portion to the tension applying member becomes higher than a predetermined level as the movable member moves in the second direction.

5. The cable wiring structure according to claim 1, wherein the tension applying member applies tension to the cable in response to movement of the movable member.

6. An image forming device comprising:
a base member;
a movable member including a carriage configured to reciprocate in a first direction and in a second direction, which is opposite to the first direction, relative to the base member and an image sensor attached to the carriage to read an image of a document when the carriage moves in the first direction;
a driving unit configured to reciprocate the movable member;
a cable, which has flexibility and comprises a curved portion which has a curved shape and is convex toward the second direction wherein one end of the cable is fixed to the base member and the other end of the cable is connected to the image sensor;
a tension applying member, which is attached to the movable member and is movable in the first direction and in the second direction relative to the movable member, wherein when the movable member moves in the second direction, the tension applying member comes in contact with an inner circumference of the curved portion; and
a load adjustment portion, which is configured to increase a load that is applied between the tension applying member and the movable member in a case where the movable member moves in the second direction as compared with a case where the movable member moves in the first direction;
wherein the tension applying member comprises a pressing member, which is mounted on the movable member and extends from the movable member toward the curved portion so that a front end thereof comes in internal contact with the curved portion, and
wherein, when the movable member moves in the second direction, the tension applying member makes the front end of the pressing member come in contact with an inner circumference side of the curved portion to displace the pressing member relative to the movable member by a force that acts from the curved portion to the pressing member, so that the tension applying member approaches the curved portion relative to the moving member and moves the moving member in the second direction to thus apply the tension to the cable.

7. The image forming device according to claim 6, wherein the load adjustment portion is configured to increase the load that is applied between the tension applying member and the movable member when the load adjustment portion moves from a predetermined reading range in which the image sensor is capable of image reading to the first direction.

8. The image forming device according to claim 6, wherein the movable member comprises a spacer to keep a distance between the image sensor and a document placement portion located on an upper side thereof constant, and
wherein the tension applying member is attached to the spacer.

9. The image forming device according to claim 6,
wherein the tension applying member and the image sensor are arranged at positions where the tension applying member and the image sensor do not overlap each other as seen from a vertical direction perpendicular to the first direction and where the tension applying member and the image sensor overlap each other in a side view in the first direction.

10. The image forming device according to claim 6,
wherein the tension applying member applies tension to the cable in response to movement of the movable member.

11. A cable wiring structure comprising:
a base member;
a movable member configured to reciprocate in a first direction and in a second direction, which is opposite to the first direction, relative to the base member;
a driving unit configured to reciprocate the movable member;
a cable, which has flexibility and comprises a curved portion which has a curved shape and is convex toward the second direction, wherein one end of the cable is fixed to the base member and the other end of the cable is connected to the movable member;
a tension applying member, which is attached to the movable member and is movable in the first direction and in the second direction relative to the movable member, wherein when the movable member moves in the second direction, the tension applying member comes in contact with an inner circumference of the curved portion; and
a load adjustment portion, which is configured to increase a load that is applied between the tension applying member and the movable member in a case where the movable member moves in the second direction as compared with a case where the movable member moves in the first direction;
wherein the load adjustment portion is a lock mechanism that temporarily fixes the tension applying member and the movable member to a predetermined position.

12. The cable wiring structure according to claim 11,
wherein the tension applying member comprises a pressing member; and
wherein the lock mechanism is located at a side of an end portion in the first direction with respect to a center of a tension applying member having a rod shape.

13. The cable wiring structure according to claim 12, wherein the lock mechanism is located at the end portion of the pressing member.

14. An image forming device comprising:
a base member;
a movable member including a carriage configured to reciprocate in a first direction and in a second direction, which is opposite to the first direction, relative to the base member and an image sensor attached to the carriage to read an image of a document when the carriage moves in the first direction;
a driving unit configured to reciprocate the movable member;
a cable, which has flexibility and comprises a curved portion which has a curved shape and is convex toward the second direction wherein one end side of the cable is fixed to the base member and the other end side of the cable is connected to the image sensor;
a tension applying member, which is attached to the movable member and is movable in the first direction and in the second direction relative to the movable member, wherein when the movable member moves in the second direction, the tension applying member comes in contact with an inner circumference of the curved portion; and
a load adjustment portion, which is configured to increase a load that is applied between the tension applying member and the movable member in a case where the movable member moves in the second direction as compared with a case where the movable member moves in the first direction;
wherein the load adjustment portion is a lock mechanism that temporarily fixes the tension applying member and the movable member to a predetermined position.

15. The image forming device according to claim 14,
wherein the tension applying member comprises a pressing member; and
wherein the lock mechanism is located at a side of an end portion in the first direction with respect to a center of a tension applying member having a rod shape.

16. The image forming device according to claim 15, wherein the lock mechanism is located at the end portion of the pressing member.

* * * * *